United States Patent
Imai et al.

(10) Patent No.: US 6,446,872 B1
(45) Date of Patent: *Sep. 10, 2002

(54) CARD READER HAVING A SPACE FOR DISCHARGING FOREIGN MATTER THEREIN

(75) Inventors: Eiji Imai; Kenji Hirasawa, both of Nagano (JP)

(73) Assignee: Sankyo Seiki Mfg. Co., Ltd., Nagano (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/182,134

(22) Filed: Oct. 29, 1998

(30) Foreign Application Priority Data

Nov. 7, 1997 (JP) .............................. 9-306046

(51) Int. Cl.[7] .............................. G06K 13/00
(52) U.S. Cl. ...................... 235/475; 235/477
(58) Field of Search ................ 235/475, 477, 235/479, 480, 482, 483, 486

(56) References Cited

U.S. PATENT DOCUMENTS

| | | | |
|---|---|---|---|
| 3,850,299 A | * 11/1974 | Kreitzer .................... | 209/75 |
| 4,889,978 A | * 12/1989 | Koshida et al. ............ | 235/379 |
| 5,318,164 A | * 6/1994 | Barnes et al. .............. | 194/200 |
| 5,505,289 A | * 4/1996 | Watabe et al. ............. | 194/206 |
| 5,508,501 A | * 4/1996 | Fujimoto et al. .......... | 235/441 |
| 5,532,466 A | * 7/1996 | Konno et al. .............. | 235/441 |
| 5,698,832 A | * 12/1997 | Someya et al. ............. | 235/475 |
| 5,892,210 A | * 4/1999 | Levasseur ................... | 235/486 |
| 5,929,426 A | * 7/1999 | May ........................... | 235/475 |

FOREIGN PATENT DOCUMENTS

| | | |
|---|---|---|
| CH | 683 725 A | 11/1991 |
| FR | 2 577 334 A | 8/1986 |
| JP | 62 27 66 82 | 12/1987 |
| WO | WO 95 29459 | 11/1995 |

OTHER PUBLICATIONS

*English abstract of FR 2 577 334 A.

*English abstract of JP 62 27 66 82.

*English abstract of CH 683 725 A.

*English abstract of WO 95 19459.

* cited by examiner

Primary Examiner—Karla D. Frech
Assistant Examiner—Diane I. Lee
(74) Attorney, Agent, or Firm—Reed Smith LLP

(57) ABSTRACT

A card reader which drives a card transporting device with a driving motor to transport cards by the card transporting device in a card passage, having a card entering passage formed in the same direction as the card passage by extending the distance between a front surface of a card inlet, from which the cards are inserted, and a front edge of the card transporting device. The card entering passage has card guiding portions formed in the same direction as the card passage for supporting inserted cards from both sides in the card transporting direction and a space for discharging foreign matter formed between the card guiding portions at both sides using nearly the entire space in the width direction between the card guiding portions.

5 Claims, 3 Drawing Sheets

CARD READER HAVING A SPACE FOR DISCHARGING FOREIGN MATTER THEREIN

BACKGROUND OF THE INVENTION a) Field of the Invention

The present invention relates to a card reader.

b) Description of the Related Art

In a card reader which takes cards inside to process data, a card inlet from which cards are inserted is formed to be widened toward the front, thus providing for easy insertion of cards. To prevent foreign matter other than the cards from entering inside the card reader, a shutter may be provided deep inside the card inlet. Only when legal cards are inserted, is the shutter moved to an open position to take the cards inside the card reader.

On the other hand, there are quite a few card readers which do not accommodate the shutter mechanism described above. Since such card readers cannot perfectly prevent foreign matter from entering, the foreign matter, such as coins and medals, inserted from the card inlet on purpose or by mistake may be taken inside the card reader and caught, causing a breakdown of the machine. To solve such a problem, a hole may be provided in a card transporting path in such a card reader utilizing a space such as a rear step of a card transporting roller so that the inserted foreign matter will not be caught in the card transporting path.

However, motor-driven card readers or such card readers that have heads at the top and bottom for recording and reproducing data on cards require many construction components and cannot provide a space for creating the hole for discharging foreign matter at a desirable position. Accordingly, only such foreign matter inserted at the position which corresponds to the hole provided at an available space can be discharged out of the card transporting path.

OBJECT AND SUMMARY OF THE INVENTION

A primary object of the present invention is to provide a card reader in which foreign matter inserted from the card inlet on purpose or by mistake is discharged no matter where it is in the card running width so as to prevent it from entering inside the card reader.

In accordance with the invention, a card reader which drives a card transporting means with a driving motor to transport cards by the card transporting means in a card passage, comprises a card entering passage formed in the same direction as the card passage by extending the distance between a front surface of a card inlet, from which the cards are inserted, and a front edge of the card transporting means. The card entering passage has card guiding portions formed in the same direction as the card passage for supporting inserted cards from both sides in the card transporting direction and a space for discharging foreign matter formed between the card guiding portions at both sides using nearly the entire space in the width direction between the card guiding portions.

DESCRIPTION OF THE PREFERRED EMBODIMENTS

A configuration of the present invention will be described in detail based on an embodiment illustrated in drawings.

Figure 1:
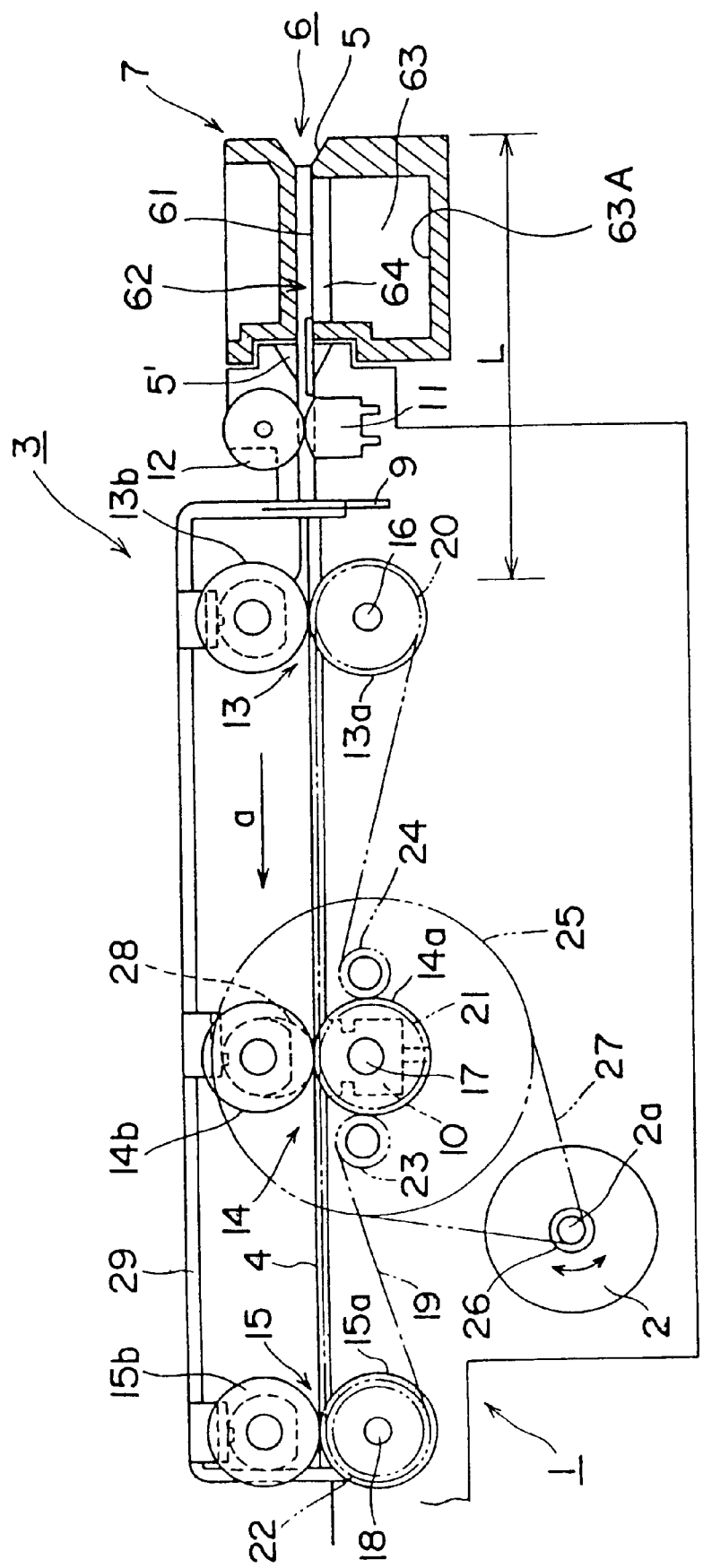
FIG. 1 is a side view of an embodiment of a card reader of the present invention.

FIGS. 1 though 3 illustrates an embodiment of a card reader of the present invention. A card reader 1 comprises a card transporting means 3 for transporting a card C inserted from a card inlet 5, a card passage 6 extending from the card inlet 5 in the direction of card insertion illustrated by an arrow a, another card passage 4, a shutter 9 free to open and close (to move) with respect to the card passage 4, and a magnetic head 10 for processing (recording/reproducing) magnetic data on the card C. The card C is transported in the card passage 4 by the card transporting means 3 driven by a driving motor 2. A card entering passage 6 is formed by extending the distance L longer than usual. The distance L is from the front surface of the card inlet 5, from which the card C is inserted, to the front edge of the card transporting means 3, that is, to the edge of a first transporting roller pair 13 on the card inlet side.

Figure 2:
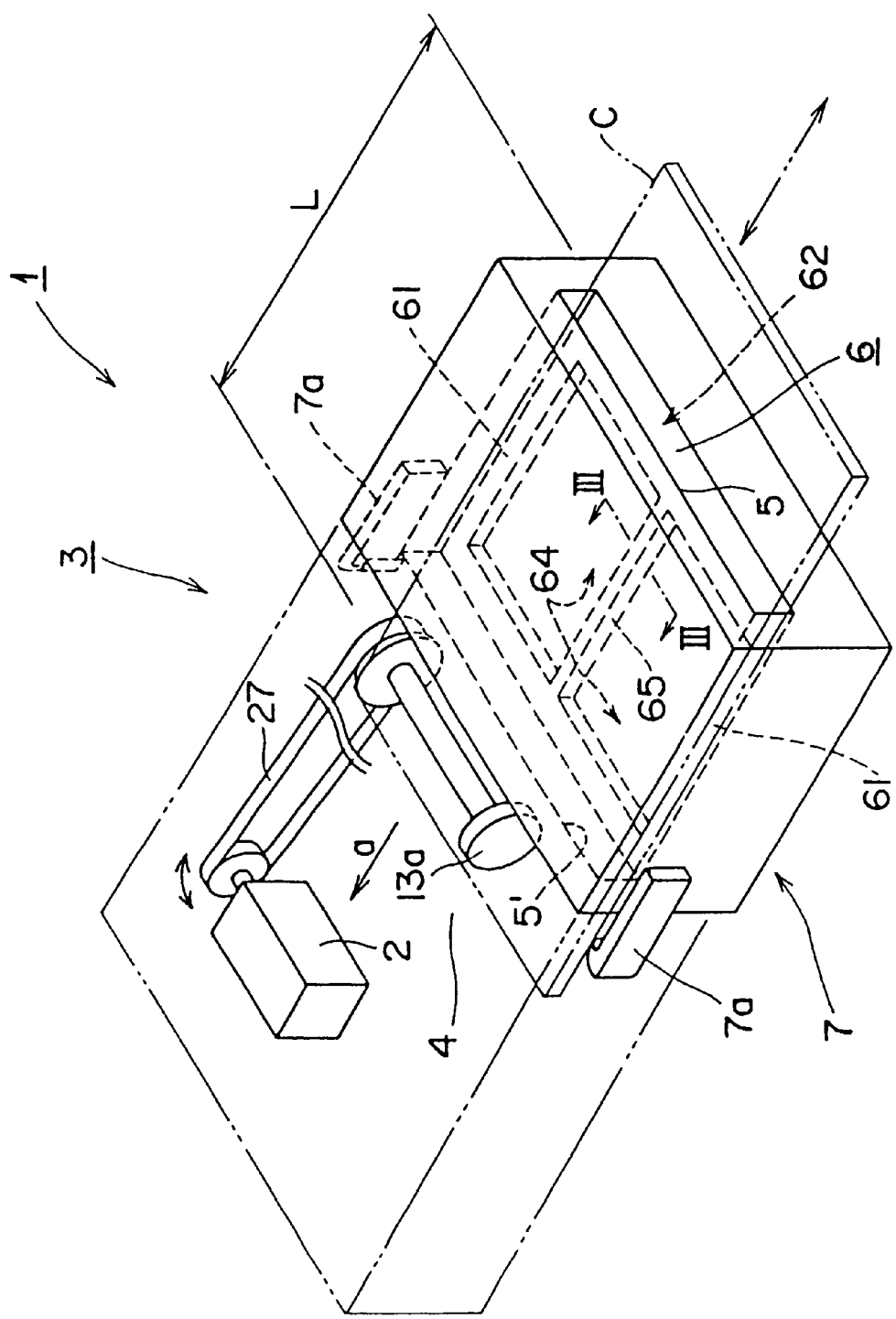
FIG. 2 is a perspective view of a card reader main body and a card entering passage.

The card entering passage 6 has, as illustrated in FIG. 2 in detail, card guiding portions 61, 61 for supporting the inserted card C with both sides in the card transporting direction and a space 62 for discharging foreign matter, formed between the card guiding portions 61, 61 at both sides. The space 62 is created between the card guiding portions 61, 61 to use the entire available space in the width direction (the direction orthogonal to the card transporting direction) between the card guiding portions 61, 61. In this embodiment, as illustrated, a card entering unit 7 is newly attached to the front surface of the conventional card reader to form the card entering passage 6 which is connected to a conventional card inlet 50 (of the card reader 1 main body) so that the distance L between the front surface of the card inlet 5 and the front edge of the card transporting means 3 is extended. Therefore, the space 62 can be created without being disturbed by other mechanisms used for card insertion.

The card entering unit 7 is formed for enabling the inserted foreign matter to be discharged, and provided attachably and detachably to the card reader 1 main body. Although the means for freely attaching and detaching it is not particularly limited, the card entering unit 7 in this embodiment is attached to the card reader 1 main body with attaching-detaching means 7a, 7a consisting of nails that engage with the main body, as illustrated in FIG. 2. In this manner, the card entering unit 7 is made attachable and detachable with respect to the card reader 1. This facilitates the attachment and detachment of the card entering unit which includes the space 62 having a dimension for targeted foreign matter, for example, different currency coins and medals used in various countries and other assumed foreign matter.

Further inward than the card inlet 5 of the card entering unit 7 is the card entering passage 6, which is connected to the conventional card inlet 50 (of the card reader 1 main body) without interposing a step to essentially extend the card passage 4 so that cards can run smoothly. The length of the card entering passage 6 in the card entering unit 7 is not particularly limited. However, the distance L from the front surface of the card inlet 5 to the front edge of the card transporting means 3, that is, the distance between the front surface of the card inlet 5 and the first transporting roller pair 13 illustrated in FIG. 1 is shorter than the length of the card in the insertion direction so that the card is taken inside by the first transporting roller pair 13 immediately at the insertion by hand. Also, it is desirable that the distance L is sufficiently long within the range shorter than the card in the insertion direction. In this embodiment, the distance L is at least half the length of the card in the insertion direction so that sufficient space 62 can be obtained to discharge foreign matter.

In addition, the card guiding portions 61, 61 are formed at both sides of the card entering passage 6 in the insertion direction. The card guiding portions 61, 61 is not limited to its shape and form as long as they support both sides of the card C. In this embodiment, as illustrated in FIG. 2, both edges projected inside from the both sides of the card entering unit 7 guide the card C to the conventional card inlet 50 while supporting both sides of the inserted card C from the bottom.

The portion between the both card guiding portions 61, 61 is the space 62 for discharging foreign matter so that all the foreign matter smaller than the width between both card guiding portions 61, 61 can be discharged from the card passage. The space 62 for discharging foreign matter is formed with a recess portion 63 having a foreign matter receiving plane 63A (see FIG. 1) below the card guiding portions 61, 61 so that foreign matter such as coils can be held temporarily. Although the opening of the space 62 is not specifically limited in shape and size, it is large enough to discharge foreign matter. As illustrated in FIG. 2, a rectangular shape is advantageous to obtain sufficient opening of the space 62. The space 62 may not be formed with the recess portion 63 having the foreign matter receiving plane 63A, but the front of a frame constituting the card inlet 5 of the card entering unit 7 may be extended downwardly so that the inserted foreign matter can be dropped in a place which does not bother other components in the machine.

Further, the card entering passage 6 has a center card guide 65 extending in the card insertion direction between the card guiding portion 61, 61 at both sides. The center guide 65 of this embodiment nearly divides the foreign matter discharging space 62 in half and supports the center of the transported card C from the bottom so that the card C is prevented from being bent or warped and can run smoothly. However, the shape is not limited to this, but the center card guide 65 may neither extend straight in the card insertion direction, a, for example, nor should be provided at the center in the width direction. As long as the dimension for the opening 64 of the space 62 can be obtained sufficiently, it may be possible to form two or more center card guides 65.

Figure 3C:
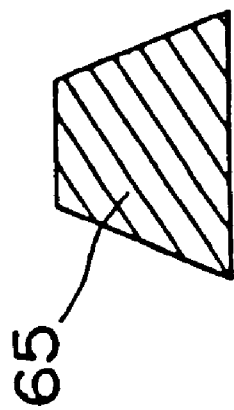
FIGS. 3(A) through 3(C) show three shapes of the cross section of a center card guide cross-sectioned by III—III line of FIG. 2.
Figure 3B:
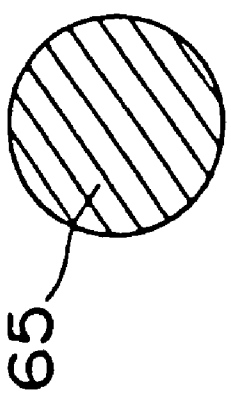
Figure 3A:
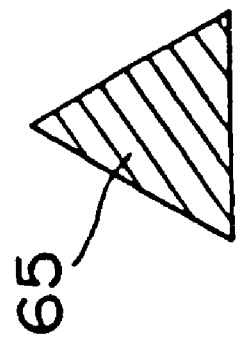

The top surface of the center card guide 65 is in a shape with which foreign matter drops easily but will not to be caught in the space 62. In particular, the top surface of the center card guide 65 is formed to have a triangle, circle, or trapezoidal cross-section as illustrated in FIGS. 3(A) through 3(C), and also formed in a shape or size with which foreign matter loses balance. Thus, it is desirable to form the top surface of the center card guide 65 to make it easy to drop foreign matter. Note that, when the card C is to be supported only by the card guiding portions 61, 61 at both sides, the center card guide 65 is not necessary.

After the conventional card inlet 50 in the card insertion direction, a, and before the shutter 9, a detecting means is provided for detecting whether the inserted card is legal and moving the shutter 9 to an open position when the card is legal. In this embodiment, the detecting means consists of a pre-head 11 which contacts the magnetic stripe on the card C for detecting that the inserted substance has the magnetic signals. However, the detecting means may be a mechanical switch or optical switch for detecting the card width. The pre-head 11 is made of a magnetic head so that it detects whether the inserted card is legal or not by detecting the presence of the magnetic signals. The output from the pre-head 11 is a portion of the trigger signals for driving the drive motor 2 and controlling the open-close movement of the shutter 9. After the pre-head 11 detects the legality of the card, the shutter 9 moves to the open position to be ready to take the card inside the card reader, and also drives the motor 2 to take the card inside with the transporting rollers. Above the card passage 4 and opposite the pre-head 11, a rotatable pad roller 12 is arranged.

The card transporting means 3 provided inside the card reader 1 comprises the driving motor 2, driving pulleys 25, 26, driving belt 27, and transporting roller pairs 13, 14, 15, as illustrated in FIG. 1. Each of the transporting roller pairs 13, 14, 15 is arranged such that the first transporting roller pairs 13, the second transporting roller pairs 14, and the third transporting roller pairs 15 are in this order in the card insertion direction, a. Each of the axial distances between the first and second transporting roller pairs 13, 15 and the second and third transporting roller pairs 14, 15 is shorter than the total length of the card C. Each of the transporting rollers 13, 14, 15 consists of driving rollers 13a, 14a, 15a and secondary rollers 13b, 14b, 15b. The driving rollers are respectively located opposite the secondary rollers. Note that FIG. 2 shows only the driving motor 2, the driving belt 27, and the first driving roller 13a as the card transporting means 3.

Pulleys 20, 21, 22 around which a belt 19 is wound are respectively fixed to rotary shafts 16, 17, 18. In front and back of the pulley 21 in the card insertion direction, a, rotatable rollers 23 and 24 are provided to give a tension to the belt 19 from both sides of the pulley 21. To the rotary shaft 17, the driving pulley 25 having a larger diameter than that of the pulley 21 is formed. The driving belt is wound between the driving pulley 25 and a drive pulley 26 having a smaller diameter fixed to a drive shaft 2a of the reversely-rotatable driving motor 2 as a driving source.

When the inserted card is taken inside the card reader, the driving motor 2 rotates to drive the driving rollers 13a, 14a, 15a counterclockwise in FIG. 1. When the magnetic head 10 finishes the reading and recording of the card C, the driving motor 2 rotates in the opposite direction to drive the card transporting means 3.

In the embodiment of FIG. 1, the shutter 9 is located between the conventional card inlet 50 (of the card reader 1 main body) and the first transporting roller pairs 13 such that it freely moves into the card passage 4. The shutter 9 is driven to move with the signals detected by the pre-head 11, and moves to a closed position receded from the card passage only when legal cards are inserted, thus preventing illegal cards or foreign matter from being taken inside the card reader.

Therefore, in the embodiment of FIG. 1, the space 62 is formed only at the front side of the shutter 9 and the pre-head 11. However, when the conventional card inlet 50 is extended instead of providing the attachable-detachable card entering unit 7, the space 62 may also be formed in an available space at the side of the pre-head 11 as well as at the front of the shutter 9 and the pre-head 11.

The magnetic head 10 is provided on the axial line of the driving roller 14a and faces the card passage 4 with a gap surface thereof. The magnetic head 10 contact the magnetic card C to read the magnetic information recorded on the stripe of the card C and record the magnetic information on the stripe. At this time, either the magnetic head 10 or the pad roller 28 is pushed by a spring (not illustrated) toward the other so that the card C is held by the magnetic head 10 and the pad roller 28 with a predetermined pressing force. In this embodiment, the pad roller 28 is pushed toward the magnetic head 10, and a gap thinner than the thickness of the card C is created between the magnetic head 10 and the pad roller 28.

A movable lever 29 is rotatably supported via a rotation-supporting pin (not illustrated) in the direction orthogonal to the card running direction and freely moves between the contact position for making each of the secondary rollers 13b, 14b, 15b contacts with each of the driving rollers 13a, 14a, 15a and the receded position for making each of the secondary rollers 13b, 14b, 15b recede from the card passage 4. The movable lever 29 also has the width, ⅓ of the width of the card passage 4, positions the secondary rollers 13*b*, 14*b*, 15*b* supported thereby in the center of the card passage 4, and creates a space above the card passage 4.

According to the card reader 1 configured as above, the space 62 having the opening 64 large enough to discharge coins, medals, and other foreign matter can be created at the newly formed card entering passage 6. Therefore, even if foreign matter such as coins are inserted from the card inlet 5, the foreign matter will be discharged. In addition, according to the present invention, since the space 62 for discharging foreign matter can be provided by attaching the card entering unit 7, as described above, the card entering unit 7 can be applied in conventional card readers.

Note that, although the above embodiment is a suitable example of the present invention, the present invention is not limited to this embodiment, but can be variously modified within the scope of the invention. For example, although the attachable-detachable card entering unit 7 is provided in the conventional card reader 1 so as to create the space 62 for discharging foreign matter in the above embodiment, the conventional card inlet 50 of the card reader 1 may be extended outwardly by the length of the card entering unit 7 to create the space 62 integrally with the card reader main body.

In the embodiment, to extend the distance L from the front surface of the card inlet 5 to the front edge of the card transporting means 3, a separately(-made) card entering unit is provided to move the card inlet 5 forward. However, the foreign matter discharging space 62 may be provided at the card entering portion by positioning each of the transporting roller pairs of the card transporting means 3 and the shutter at more back side than usual to relatively extend the distance L.

It is understood from the above description that, in the card reader of the present invention, the distance between the front surface of the card inlet from which cards are inserted and the front edge of the card transporting means is extended to form the card entering passage, and the card entering passage has the card guiding portions, which support the inserted card from both sides, and the space for discharging foreign matter formed between the card guiding portions. Therefore, most foreign matter other than cards which are inserted from the card inlet will be discharged from the card entering passage. With this, most foreign matter is prevented from entering inside the card reader. Also, when legal cards are inserted from the card inlet, they are guided by the card guiding portions and transported by the card transporting means in the same manner as the conventional one.

While the foregoing description and drawings represent the preferred embodiments of the present invention, it will be obvious to those skilled in the art that various changes and modifications may be made therein without departing from the true spirit and scope of the present invention.

What is claimed is:

1. A card reader which drives a card transporting means with a driving motor to transport cards by said card transporting means in a card passage, comprising:

a card entering passage formed in same direction as said card passage by extending a distance between a front surface of a card inlet, from which said cards are inserted, and a front edge of said card transporting means;

said card entering passage having card guiding portions formed in the same direction as said card passage for supporting inserted cards and a space for discharging foreign matter formed between said card guiding portions using nearly the entire space in a width direction of the card passage;

said space being a recess portion having a foreign matter receiving plane below said card guiding portions or an opening into which foreign matter is dropped downward, the distance between said front surface of said card inlet and said front edge of said card transporting means being at least half of the card length in the card insertion direction, said card entering passage having a center card guide that extends in the card insertion direction between said card guiding portions at both sides, and a top surface of said center guide being formed for facilitating foreign matter to drop.

2. The card reader as set forth in claim 1 wherein said card entering passage is constituted as a card entering unit that is attachable to and detachable from a card reader main body.

3. The card reader as set forth in claim 1 wherein said card entering passage is formed integral with a card reader main body.

4. A card reader which detects the legality of an inserted card to move a movable shutter to an open position and takes said inserted card inside a card reader with multiple card transporting roller pairs driven by a driving motor, comprising:

a distance between a front surface of a card inlet, from which said card is inserted, and a front edge of a first transporting roller pair is at least half of the card length in the card insertion direction to form a card entering passage;

said shutter being arranged before said first transporting roller pair; and a space for discharging foreign matter being created in said card entering passage before said shutter, said card entering passage having card guiding portions for supporting said inserted card and said space for discharging foreign matter using nearly entire space in a width direction of the card passage, said card entering passage having a center card guide that extends between said card guiding portions at both sides in the card insertion direction; and the top surface of said center card guide being formed to facilitate foreign matter to drop.

5. The card reader as set forth in claim 4 wherein said card entering passage has detecting means for moving said shutter to said open position, card guiding portions for supporting said inserted card from both sides in the card transporting direction, and said space for discharging foreign matter in front of said detecting means and between said card guiding portions at both sides.

* * * * *